UNITED STATES PATENT OFFICE.

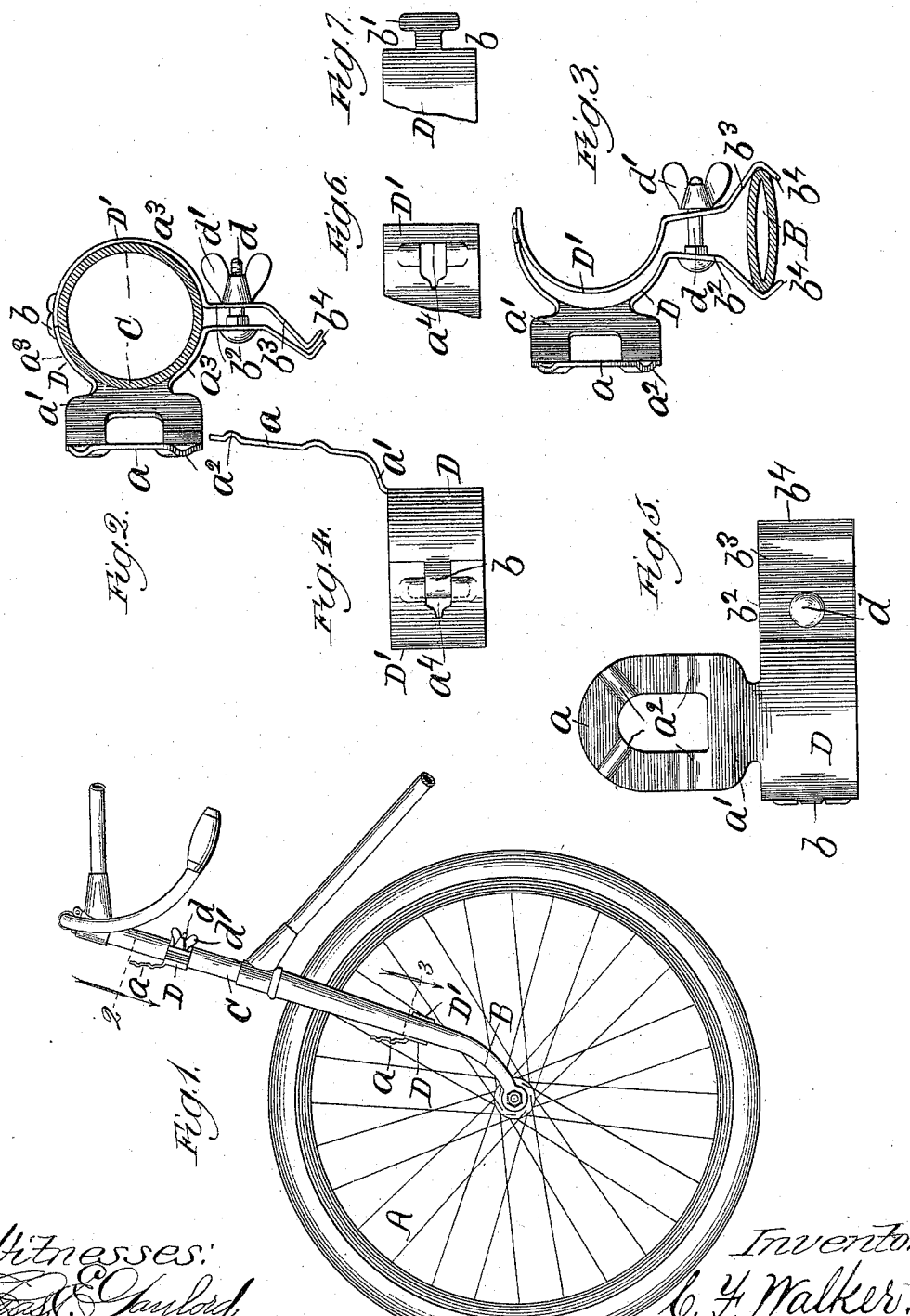

CHARLES F. WALKER, OF CHICAGO, ILLINOIS.

BICYCLE-LAMP BRACKET.

SPECIFICATION forming part of Letters Patent No. 570,240, dated October 27, 1896.

Application filed November 14, 1895. Serial No. 568,899. (No model.)

*To all whom it may concern:*

Be it known that I, CHARLES F. WALKER, a citizen of the United States, residing at Chicago, in the county of Cook and State of Illinois, have invented certain new and useful Improvements in Bicycle-Lamp Brackets; and I do hereby declare the following to be a full, clear, and exact description of the invention, such as will enable others skilled in the art to which it appertains to make and use the same.

This invention relates to that class of devices that are employed in connection with bicycles for the purpose of supporting a lamp or lantern on some part of the frame structure, and has for its object to provide a bracket-holder of this character that is capable of being converted into different forms, whereby the same is adapted to be attached to different parts of a bicycle structure.

Figure 1 is an elevation of the front wheel and a part of the frame, showing the bracket-holder in two different locations; Fig. 2, a section on line 2, Fig. 1, looking in the direction indicated by the arrow, showing the bracket clamped on the frame-head; Fig. 3, a section on line 3, Fig. 1, showing the bracket clamped in position on one of the fork members; Fig. 4, an end elevation; Fig. 5, a side elevation. Figs. 6 and 7 are broken-away end views of the two bracket members, showing a detachable hinged or pivot connection.

A represents the front wheel of the bicycle, B the fork, and C the head joining the fork.

The bracket-clamp consists of two members D D'. The member D is provided with an upwardly-extended plate $a$, with which the socket connection of a bicycle-lamp is adapted to be engaged and supported thereon. The plate $a$ is bent outward near the base, as at $a'$, to afford clearance between it and the frame for the lamp-socket to slip into place. This plate is also provided with a number of corrugations or ribs $a^2$, which will both thicken and stiffen the plate and permit of the use of a thinner and lighter metal and at the same time afford a better frictional holding-surface for the lamp-socket.

The bracket members are curved to form a circle for a part of their length, as at $a^3$, each member forming a half-circle and adapted to encompass the head C in a clamped position, as shown in Fig. 2. The bracket member D' is provided in its curved meeting end with an elongated slot $a^4$, Fig. 6. The corresponding joining end of member D is provided with neck extension $b$, Fig. 7, terminating in a bar $b'$, which may be inserted through the slot $a^4$ in member D' when held in the proper position, then turned to lock the adjoining ends together, bringing the bar $b'$ into the vertical position indicated by dotted lines in Fig. 4, and connecting the curved ends of the bracket by a detachable hinged or pivotal joint. On the opposite side the bracket members have parallel extensions $b^2$, the oblique continuations $b^3$, and finally terminating in the hook-like ends $b^4$. The parallel parts $b^2$ are perforated for the insertion therethrough of the clamping-bolt $d$, with which the wing-nut $d'$ has a threaded engagement.

When the bracket is attached to the head between the wheel and handle-bar, it is arranged in the manner illustrated in Fig. 2, the hook ends $b^4$ nesting together.

When it is necessary to carry the lamps lower down, the member D' of the bracket may be turned on its pivotal connection with member D by first removing the clamping-bolt and brought into the reversed position shown in Fig. 3 and bringing the hook ends $b^4$ into their opposite position to engage with the fork between the axle and rim of the wheel.

The fork members are ordinarily of an elliptical shape in cross-section and the hook ends of the bracket are bent so as to conform to and fit the oval edge thereof, but it is obvious that these ends may be bent to engage with different contours of the frame structure. This arrangement provides a lamp-holding bracket that may be readily converted into different forms to permit of the same being conveniently adjusted and attached to different parts of the frame, whether of a cylindrical or other contour.

Having thus described my invention, what I claim, and desire to secure by Letters Patent, is—

1. A lamp-holding bracket, consisting of two clamping members detachably secured together, one of said members being adapted to be converted into a reverse position with reference to the other member, substantially as described.

2. A lamp-holding bracket, consisting of two members hinged or pivoted together at one side, one of said members being capable of being converted into a reversed position with reference to the other member, so that when the reversible part is in one position it forms a clamp of one style, and when it is in the second position it forms a clamp of another style, and a clamping-bolt, locking said members in either position, substantially as described.

3. A lamp-holding bracket, consisting of two members, having a circular part, and a lateral extension part, terminating in hook ends, said members having a pivotal connection and one member adapted to be reversed in its position with reference to the other, and a clamping-bolt inserted through said members, substantially as described.

In testimony whereof I affix my signature in presence of two witnesses.

CHARLES F. WALKER.

Witnesses:
  L. B. COUPLAND,
  JOHN BEERMAN.